US008011302B2

(12) United States Patent
Abaziou

(10) Patent No.: US 8,011,302 B2
(45) Date of Patent: Sep. 6, 2011

(54) PYROTECHNIC GAS GENERATOR TEMPORARILY STORING SOME GASES

(75) Inventor: Xavier Abaziou, Landerneau (FR)

(73) Assignee: Autoliv Development AB, Vargarda (SE)

( * ) Notice: Subject to any disclaimer, the term of this patent is extended or adjusted under 35 U.S.C. 154(b) by 308 days.

(21) Appl. No.: 11/991,128

(22) PCT Filed: Aug. 29, 2006

(86) PCT No.: PCT/EP2006/065770
§ 371 (c)(1),
(2), (4) Date: Feb. 26, 2008

(87) PCT Pub. No.: WO2007/025963
PCT Pub. Date: Mar. 8, 2007

(65) Prior Publication Data
US 2009/0283006 A1    Nov. 19, 2009

(30) Foreign Application Priority Data
Sep. 1, 2005   (FR) ...................... 05 08972

(51) Int. Cl.
*B60R 21/26* (2006.01)
*B60R 21/263* (2011.01)
(52) U.S. Cl. .................. 102/530; 280/736; 280/741
(58) Field of Classification Search ................. 102/530, 102/531; 280/736, 737, 741, 742
See application file for complete search history.

(56) References Cited

U.S. PATENT DOCUMENTS

| 3,473,824 | A |   | 10/1969 | Carey et al. |  |
|---|---|---|---|---|---|
| 5,345,875 | A |   | 9/1994 | Anderson |  |
| 5,470,104 | A | * | 11/1995 | Smith et al. ................... | 280/737 |
| 5,551,724 | A | * | 9/1996 | Armstrong et al. ........... | 280/737 |
| 5,683,104 | A | * | 11/1997 | Smith ........................... | 280/736 |
| 5,851,027 | A | * | 12/1998 | DiGiacomo et al. ......... | 280/736 |
| 5,907,120 | A | * | 5/1999 | Mooney et al. ............... | 102/521 |
| 5,979,936 | A | * | 11/1999 | Moore et al. .................. | 280/736 |
| 6,168,201 | B1 | * | 1/2001 | Takeyama et al. ............ | 280/737 |
| 6,206,418 | B1 |   | 3/2001 | Perotto et al. |  |
| 6,231,075 | B1 | * | 5/2001 | Otsu ............................. | 280/735 |
| 6,289,820 | B1 | * | 9/2001 | Anacker et al. ............... | 102/530 |
| 6,572,140 | B2 | * | 6/2003 | Specht et al. ................. | 280/736 |
| 6,601,872 | B2 | * | 8/2003 | Zimbrich et al. ............. | 280/737 |
| 6,769,714 | B2 | * | 8/2004 | Hosey et al. .................. | 280/737 |
| 7,073,820 | B2 |   | 7/2006 | McCormick |  |
| 7,125,042 | B2 | * | 10/2006 | Adamini et al. .............. | 280/736 |
| 7,178,830 | B2 |   | 2/2007 | Blackburn |  |
| 7,237,801 | B2 |   | 7/2007 | Quioc et al. |  |

(Continued)

FOREIGN PATENT DOCUMENTS

EP    0 835 786 A    4/1998

(Continued)

*Primary Examiner* — Bret Hayes
(74) *Attorney, Agent, or Firm* — Harness, Dickey & Pierce, P.L.C.

(57) ABSTRACT

The present invention related to a pyrotechnic gas generator intended for motor vehicle safety, comprising a sealed housing (1), which contains: —at least one combustion chamber (C) containing a pyrotechnic charge (3), the combustion of which is initiated by an initiator (2) associated with the chamber; —at least one plenum chamber (T) for receiving the gases generated by the combustion of the charge (3) for removing them to the exterior, via at least one discharge aperture (10) formed in said housing (1). It is characterized in that said housing (1) also contains means (R) for temporarily storing at least some of the combustion gases.

16 Claims, 5 Drawing Sheets

U.S. PATENT DOCUMENTS

| | | | |
|---|---|---|---|
| 7,267,365 B2 | 9/2007 | Quioc | |
| 7,343,862 B2 | 3/2008 | McCormick | |
| 7,367,584 B2 | 5/2008 | Blackburn | |
| 7,654,565 B2 | 2/2010 | McCormick et al. | |
| 7,739,957 B2 | 6/2010 | Patterson et al. | |
| 7,762,585 B2 | 7/2010 | Patterson et al. | |
| 2002/0030354 A1* | 3/2002 | Specht et al. | 280/741 |
| 2002/0033590 A1 | 3/2002 | Adkisson | |
| 2003/0034641 A1* | 2/2003 | Zimbrich et al. | 280/741 |
| 2003/0230881 A1* | 12/2003 | Hosey et al. | 280/737 |
| 2005/0029785 A1* | 2/2005 | Bilbrey et al. | 280/736 |
| 2005/0212271 A1* | 9/2005 | Adamini et al. | 280/736 |
| 2006/0005734 A1 | 1/2006 | McCormick | |
| 2006/0091660 A1* | 5/2006 | Lang et al. | 280/737 |
| 2007/0075535 A1* | 4/2007 | Trevillyan et al. | 280/737 |
| 2007/0095035 A1 | 5/2007 | Quioc | |
| 2007/0248511 A1 | 10/2007 | Maxon et al. | |
| 2008/0078486 A1 | 4/2008 | Khandhadia et al. | |

FOREIGN PATENT DOCUMENTS

| | | | |
|---|---|---|---|
| FR | 1 576 977 A | 8/1969 | |

* cited by examiner

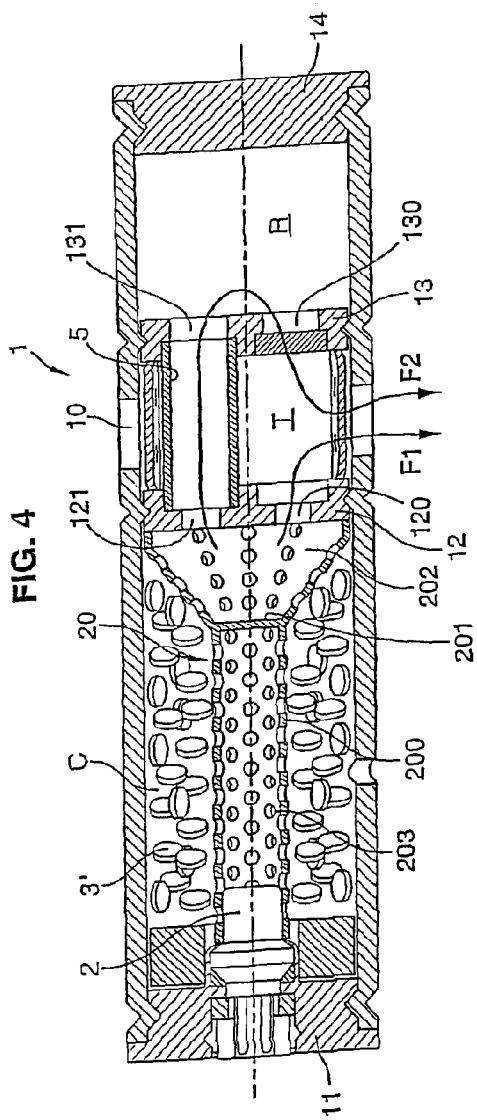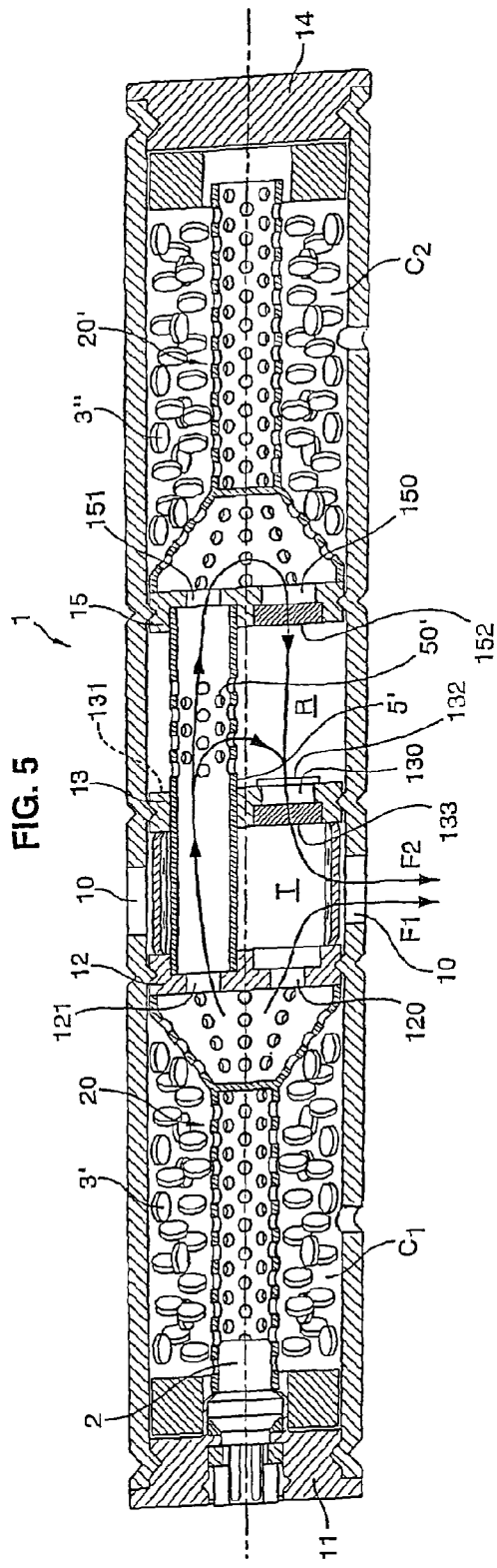

PYROTECHNIC GAS GENERATOR TEMPORARILY STORING SOME GASES

CROSS-REFERENCE TO RELATED APPLICATIONS

This application is a 371 National Stage of International Application No. PCT/EP2006/065770, filed Aug. 29, 2006 and published in English as WO 2007/025963 A1 on Mar. 8, 2007. This application claims priority to French Patent Application No. 05 08972, filed Sep. 1, 2005, which application is herein expressly incorporated by reference.

The present invention relates to a gas generator intended for motor vehicle safety.

It is particularly designed to inflate an airbag.

When the occupant of a vehicle equipped with a generator connected to an airbag is in a position other than that consisting in being seated on the seat, chest forward and feet placed on the floor, he is said to be "out of position", abbreviated to "OOP".

It is commonly known that an airbag is very rapidly inflated. In situations in which the occupant is "out of position", the risk that the airbag may injure the occupant during its inflation is increased.

Solutions have already been sought for deploying and opening the airbag as gently and gradually as possible.

Thus, document US-A-2002/2033590 describes a distribution device for a safety system. This involves reducing the aggression to the airbag and preventing its deployment from injuring the occupant. In a variant, a reservoir is placed around the distribution head of the gas generator. The document states that this reservoir serves as a "buffer" and allows rapid inflation of the bag, without aggressively acting on it.

Document EP-A-0 835 786 describes an airbag containing a smaller bag. In a variant, the inner bag is completely sealed and comprises a fusible stitch which ruptures under a certain pressure. In another variant, the bag has the shape of a tube open at both ends. During the inflation of the airbag, the tube opens and is completely deployed. The object here is to reduce the aggression to the outer bag by the gases from the generator.

In FR-A-1 576 977, the airbag contains an initially sealed inner bag, designed to open completely above a certain pressure. The kinetic energy is thereby reduced during the deployment of the bag, to prevent a violent impact with the occupant of the vehicle.

In all these documents, attempts have been made to modify the inner space of the bag to be inflated, to prevent its deployment from occurring too violently.

The present invention pursues the same purpose as the one described in these three documents. However, the present applicant has found that this goal could be accomplished, not by modifying the inner space of the bag, but the internal architecture of the generator.

In doing so, the external physiognomy of the generator is unaffected, so that bags of a basic and very widespread structure can be connected to it.

Another object of the invention is to propose a generator of which the operation is of the adaptive type, but using a single igniter.

The present invention accordingly relates to a pyrotechnic gas generator intended for motor vehicle safety, comprising a sealed housing, which contains:

at least one combustion chamber containing a pyrotechnic charge, the combustion of which is initiated by an initiator associated with the chamber;

at least one plenum chamber for receiving the gases generated by the combustion of the charge for removing them to the exterior, via at least one discharge aperture formed in said housing.

It is noteworthy that said housing also contains means for temporarily storing at least some of the combustion gases.

Thus, the gases are conveyed into the airbag progressively, by a first followed by a second gas stream, thereby reducing the risk of injury to the occupants of the vehicle.

According to advantageous features of this generator:

said means comprise a transit chamber, separate from the combustion chamber, in which at least some of the combustion gases are stored before their removal to the exterior;

the exit of said gases from the transit chamber depends on the gas pressure prevailing in this chamber.

According to advantageous features of a first embodiment in which the generator is tubular:

it comprises a combustion chamber, a central plenum chamber and a transit chamber, longitudinally offset;

said chambers are separated in pairs, respectively by first and second partitions;

each partition has two communicating nozzles;

the combustion chamber and transit chamber are connected directly to one another by a duct which terminates in two nozzles facing the first and second partitions respectively;

the nozzle of the second partition, which lacks a duct, has selective means for allowing the passage of gas, only from the transit chamber toward the plenum chamber.

Preferably, the selective means consist of a check valve.

Advantageously:

that side of the first partition turned toward the combustion chamber comprises a shutter of said nozzles which ruptures above a first value of the gas pressure in the combustion chamber;

that side of the second partition turned toward the transit chamber comprises a shutter of said nozzle lacking a duct, which ruptures above a second value of the gas pressure in the transit chamber.

According to another embodiment in which the generator is also tubular:

it comprises two combustion chambers on either side of a central plenum chamber and a transit chamber, both longitudinally offset;

said chambers are separated in pairs, respectively by a first, a second and a third partition;

each partition has two communicating nozzles;

the combustion chambers are directly connected to one another by a duct which terminates in two nozzles, respectively facing the first and third partitions, and passing through a nozzle of the second partition;

the part of the duct passing through the transit chamber has apertures for communicating with this chamber;

the nozzles of the third and the second partitions, which lack a duct, have selective means for allowing the flow of gas, only from the second combustion chamber toward the transit chamber, and from the transit chamber toward the plenum chamber.

Preferably, the selective means consist of a check valve.

Advantageously:

that side of the third partition turned toward the second combustion chamber comprises a shutter of said nozzles which ruptures above a certain value of the gas pressure in said second combustion chamber;

that side of the second partition turned toward the transit chamber comprises a shutter of said nozzle lacking a duct, which ruptures above a second value of the gas pressure in the transit chamber.

According to yet another embodiment of a tubular generator:

it comprises two separate combustion chambers and said means comprise a transit chamber, separate from the combustion chambers, in which at least some of the combustion gases from the first chamber are, these gases subsequently igniting the pyrotechnic charge of the second chamber.

Particularly advantageously:

this generator comprises two combustion chambers on either side of a plenum chamber and a transit chamber;

the transit chamber has the shape of a duct contained in the plenum chamber;

said combustion chambers and plenum chamber are separated in pairs, respectively by first and second partitions;

each partition has a single communicating nozzle;

the combustion chambers are directly connected to one another by said duct which constitutes a transit chamber and which terminates in said nozzles;

the duct has a first and second series of apertures for communicating with the plenum chamber, placed respectively close to the first and second partitions, the second series being blocked by shutters which rupture above a predefined pressure.

According to another embodiment:

said transit chamber is annular and surrounds said combustion chamber;

said plenum chamber is also annular and surrounds said transit chamber;

the partitions separating the combustion chamber and the transit chamber on the one hand, and the transit chamber and the plenum chamber on the other, comprise communicating nozzles;

the communicating nozzles between the transit chamber and the plenum chamber are blocked by shutters, some opening above a certain pressure in the transit chamber, the others opening above a predefined and higher pressure in the transit chamber.

Other features and advantages of the invention will appear from a reading of the detailed description that follows of certain embodiments. This description, which is nonlimiting, is provided in conjunction with the drawings appended hereto, in which:

FIGS. 4 to 7 are views similar to those of FIG. 1, of four other embodiments of a tubular generator;

Figure 1:
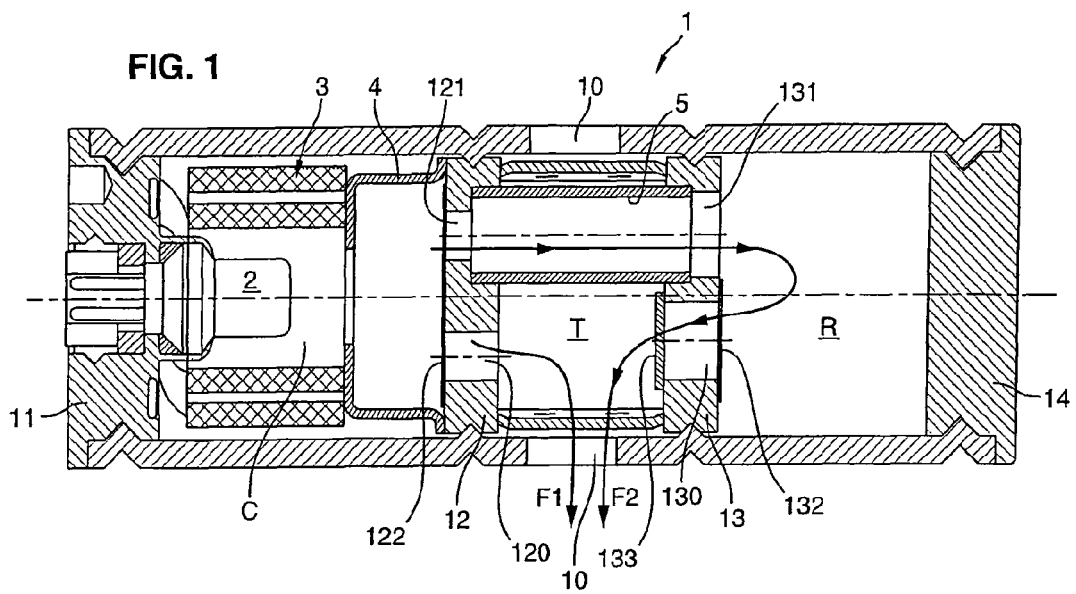
FIG. 1 is a cross-sectional view, in a longitudinal midplane, of a first embodiment of a generator of the invention, called a "tubular generator"

The pyrotechnic gas generator shown in FIG. 1 comprises a tubular housing 1, of cylindrical shape, the wall of which is crimped at each of its ends by discoid rings 11, respectively 14. Annular rims, projecting inwardly, affix the wall to the rings.

Similarly, the wall is stamped in the central part of the housing 1, on two transverse, parallel and discoid, partitions 12 and 13.

These partitions are penetrated by two orifices forming nozzles, of which more below.

The housing 1, and the rings 11 and 14 and partitions 12 and 13, are made of high mechanical and thermal strength metal. The housing 1 is, however, made from a metal which has sufficient ductility for crimping.

The partitions 12 and 13 divide the interior of the housing 1 into three longitudinally offset chambers, that is, a combustion chamber C, a plenum chamber T and a transit chamber R.

As shown in greater detail below, this chamber R constitutes means for temporarily storing at least some of the combustion gases. In other words, the gases temporarily accumulate therein.

The plenum chamber T occupies a median position.

The generator comprises an igniter 2 associated with a pyrotechnic charge 3, these two elements both being located in the combustion chamber C, placed at the left side of the figure.

The charge 3 has the shape of an annular sleeve, of generally cylindrical shape, and is fitted with a slight clearance to the interior of the wall of the housing 1.

In a manner known per se, the igniter is mounted in the central part of the ring 11 and the major part thereof penetrates into the internal space of the charge 3.

This charge is in particular maintained stationary in translation by a cup shaped grille 4, which is inserted between it and the partition 12.

As stated above, the plenum chamber T is bounded longitudinally by the partitions 12 and 13.

Transversally, it communicates outwardly via discharge apertures 10, two of which can be seen in the figure. Gas filtration means I extend annularly into this chamber, immediately next to the discharge apertures 10.

The first and second partitions 12 and 13 are each penetrated by two orifices 120 and 121, respectively 130 and 131, forming nozzles, for making the chambers communicate in pairs.

In the embodiment described here, the nozzles are placed substantially face to face.

The opposite ends of a tubular duct 5 are engaged in the nozzles 121 and 131 facing each other.

This duct therefore makes the combustion chamber C communicate directly with the transit chamber R.

That side of the first partition 12 turned toward the combustion chamber C comprises a shutter 122 of the nozzles 120 and 121. It may, for example, be a thin sheet of copper which ruptures above a certain value of the gas pressure in the combustion chamber C. For information, this pressure is about 20 MPa.

That side of the second partition 13 turned toward the transit chamber R also comprises a shutter 132 of said nozzle 130 which lacks a duct 5. This shutter is, for example, made from the same material as the previous one, but it is thicker, so that it ruptures above a second value of the gas pressure in the transit chamber R, which is higher than the preceding value given above. By way of indication, this is, for example, 40 MPa.

The other side of the second partition 13, which is turned toward the plenum chamber T, comprises, opposite the nozzle 130, selective means which allow the flow of gas, only from the transit chamber R toward the plenum chamber T. These means, 133, constitute a check valve here. However, other embodiments are possible.

In operation, a deceleration sensor generates an electrical signal, which is converted by the igniter 2 into a pyrotechnic signal, causing the combustion of the charge 3, consisting for example of propellant, placed in the combustion chamber C. The propellant generates hot gases and particles in the chamber C.

The shutter 122 ruptures when a pressure setpoint, of a predefined value, is reached.

Due to the presence of the nozzles 121 and 122 communicating with the combustion chamber C, the gases are then divided into two distinct streams $F_1$ and $F_2$.

The stream $F_1$ consists of the fraction of gas which enters the nozzle 120, flows into the plenum chamber T, and exits directly outward toward the airbag, not shown, via the filtration means I and the discharge apertures 10.

Due to the presence of the check valve 133, the gases of the stream $F_1$ cannot contact and attack the shutter 132.

The stream $F_2$ is formed from the fraction of gas which enters the duct 5, via the nozzle 121. These gases progressively accumulate in the transit chamber R. When a sufficient pressure is reached in this chamber, the shutter 132 ruptures and the check valve 133 opens, so that the stream $F_1$ can flow outward, via the filtration means I and the discharge apertures 10.

Figure 2:
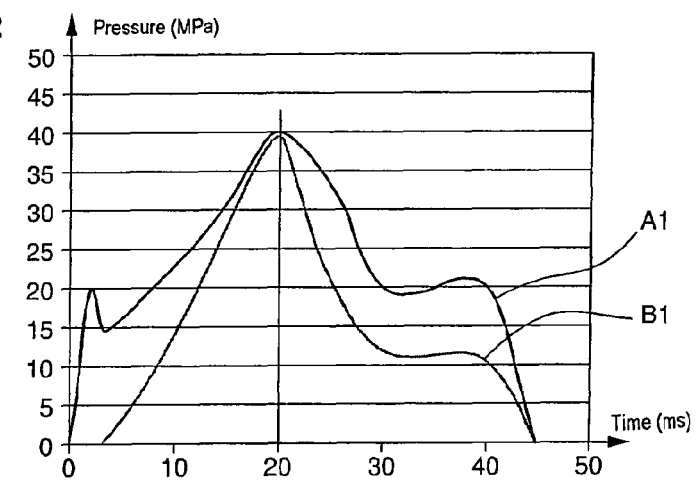
FIG. 2 shows curves illustrating the variation in pressure as a function of time, respectively in the combustion chamber and in the transit chamber of the generator in FIG. 1.

With reference to FIG. 2 in which the curve $A_1$ shows the variation in pressure in the combustion chamber C as a function of time, and the curve $B_1$ shows the variation in pressure in the transit chamber R as a function of time, the peaks at 45 and 40 MPa correspond to the time when the shutter 132 which blocked the transit chamber R ruptures.

Figure 3:
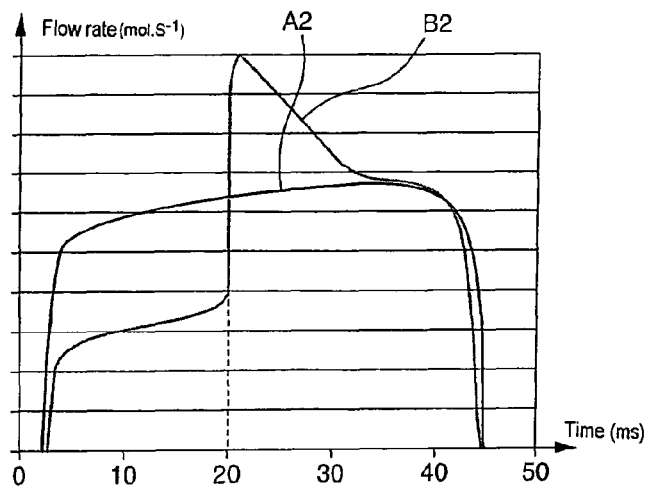
FIG. 3 shows curves illustrating the variation in instantaneous flow rates as a function of time, respectively at the outlet of the combustion chamber and the outlet of the generator in FIG. 1.

The curve $A_2$ in FIG. 3 shows the variation in the instantaneous flow rate of gas leaving the combustion chamber C as a function of time, while the curve $B_2$ shows the variation in the flow rate of gas leaving the generator, also as a function of time.

In a first operating phase, part of the flow leaving the combustion chamber C is stored in the transit chamber R (stream $F_2$). The pressure in this chamber rises steadily until the shutter 132 ruptures due to the pressure and the check valve 133 opens. In this example, this explains the virtually vertical slope of the curve $B_2$ at time t equal to 20 milliseconds.

Thanks to the structure of such a generator, the release of gas into the airbag is made less sudden, because the release of the two streams is offset in time. Moreover, this arrangement eliminates the need for a second combustion chamber, heretofore present in generators called "dual rate" or adaptive generators.

The generator in FIG. 4 has substantially the same structure as the generator in FIG. 1.

The same numerals have been employed to denote identical or similar elements.

The features of this generator are described below.

The combustion chamber accommodates a pyrotechnic charge that is not in the form of a monolithic block, but in bulk form, as pellets 3'.

Moreover, a grille 20 formed of two parts extends along the longitudinal axis of the combustion chamber C.

The first part 200 has the shape of a small diameter cylindrical tube, coaxial with the axis of the chamber C.

One of its ends, open, is fitted on the cap of the initiator 2, while its opposite end is blind. This part extends about along three quarters of the length of the chamber C. Its cylindrical wall has numerous apertures 203.

The second part 202 of the grille has a frustoconical shape. It begins at the blind end of the first part and expands to stop against the partition 12 separating the chambers C and T, at the periphery of this partition.

It also has numerous apertures similar to the apertures 203. The function of this grille is to ensure proper circulation of the gases generated by the combustion of the pellets of the charge.

For the sake of simplification, this figure does not show a shutter 122 which blocks the two nozzles of the partition 12, on the combustion chamber side C, and a shutter 132 which blocks the nozzle 130 of the partition 13, on the transit chamber side.

The operation of such a generator is quite similar to that described with reference to the generator in FIG. 1.

With reference to FIG. 5, a tubular generator is still involved, but this time, with two combustion chambers $C_1$ and $C_2$.

These chambers are positioned on either side of a plenum chamber T and a transit chamber R.

Partitions 12 and 13, perfectly similar to those already described, separate the chambers $C_1$ and T on the one hand, and T and R on the other. A third additional partition 15 separates the transit chamber R from the second combustion chamber $C_2$.

Only the first combustion chamber $C_1$ comprises an initiator 2, while the second chamber $C_2$ has no initiator.

A pyrotechnic charge 3', respectively 3", in the form of pellets, is provided in each of these combustion chambers. Grilles 20, respectively 20', similar to the one already described, are provided in the combustion chambers.

These combustion chambers are directly connected to one another by a duct 5' which terminates in two nozzles 121 and 151 respectively facing the first and third partitions 12 and 15, and passing through the nozzle 131 of the second partition 13.

The part of the duct 5' passing through the transit chamber R has apertures 50' for communicating with this chamber.

Again for the sake of simplification, this figure does not show a shutter which blocks the outlet of the tube 5' at the nozzle 151 and a second shutter which blocks the nozzle 120 of the partition 12, on the combustion chamber side.

The nozzle 150 is moreover blocked, on the transit chamber side, by a check valve 152, which can only open toward the chamber R.

The nozzle 130 is also blocked, on the plenum chamber T side, by a check valve 133, which can only open toward the chamber T. It also comprises a shutter 132, on the plenum chamber side.

In operation, and as soon as the gases are generated by the combustion of the charge present in the chamber $C_1$, said gases are divided into two distinct streams $F_1$ and $F_2$.

The stream $F_1$ consists of the fraction of gas entering the nozzle 120, terminates in the plenum chamber T, and exits outward toward the airbag, not shown, via the filtration means I and the discharge apertures 10.

Due to the presence of the check valve 133, the gases of the stream $F_1$ cannot attack the shutter 132 and penetrate into the transit chamber R.

The stream $F_2$ is formed from the fraction of gas entering the duct 5, via the nozzle 121. Some of these gases accumulate in the transit chamber R, via the apertures 50' of the tube 5'.

The remaining part enters the second combustion chamber $C_2$, as soon as the pressure present in the transit chamber is reached. This pressure is, for example, 30 MPa.

These gases then initiate the charge 3" present in the second combustion chamber $C_2$.

The gases released enter through the nozzle 150 and the check valve 152. As soon as a sufficient pressure is reached in the chamber T (for example, about 40 MPa), the shutter 132 ruptures and the check valve 133 opens, so that the stream $F_2$ can flow outward, via the filtration means I and the discharge apertures 10.

Figure 6:
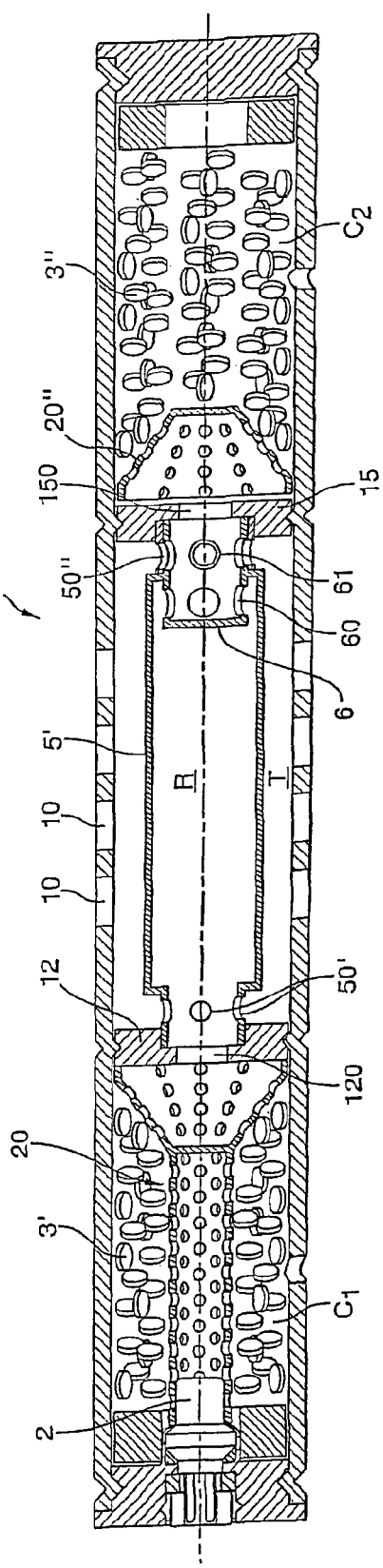

The embodiment of the generator shown in FIG. 6 has many points in common with the one just described.

Thus, there are two combustion chambers $C_1$ and $C_2$ here, positioned on either side of a plenum chamber T and a transit chamber R.

The structure of the chamber $C_1$ is perfectly similar to that described with reference to the preceding figure.

The same applies to the chamber $C_2$, except that the grille is reduced to a single frustoconical part 20" bearing against the partition 15.

This partition 15 separates the chamber $C_2$ from the plenum chamber T, while a partition 12 separates this chamber T from the combustion chamber $C_1$.

These partitions are penetrated by a single nozzle 120, respectively 150.

The opposite ends of a cylindrical duct 5', which performs a function as a transit chamber R, are fitted into these nozzles.

The chamber T hence has an annular shape which surrounds the chamber R. It is longitudinally bounded by the partitions 12 and 15 and transversely by the duct 5' and the housing 1 of the generator.

The duct 5', near its ends, terminating in the plenum chamber, has a first series of apertures 50', on the side of the first combustion chamber $C_1$, and a second series 50", on the side of the second combustion chamber $C_2$.

A short tube 6 is inserted into the duct at the level of this second series. It is perforated with a first series of apertures 60 which communicate with the transit chamber R and a second series 61, directly opposite the abovementioned apertures 50.

In the example shown here, the diameter of the nozzles 120 and 150 is about 8 mm, while that of the apertures 50" and 61 is lower, about 4 mm.

Shutters, not shown, block the nozzles 12 and 15, respectively on the combustion chamber $C_1$ side, and the combustion chamber $C_2$ side. Finally, shutters block the openings 50" of the duct 5', on the tube 6 side.

In operation, and as soon as gases are generated by the combustion of the charge present in the chamber $C_1$, the pressure rises.

The gases escape as soon as this pressure is sufficient to rupture the shutter blocking the nozzle 12. Said gases are divided into two distinct streams $F_1$ and $F_2$.

The stream $F_1$ consists of the fraction of gas which enters the duct 5', exits directly via the apertures 50', enters the plenum chamber T and exits outward via the discharge apertures 10.

The stream $F_2$ consists of the gases progressively stored in the duct 5'. They enter the tube 6 via the apertures 60.

Since the diameter of the nozzle 150 is larger than that of the apertures 50", the corresponding shutter ruptures first, as soon as a sufficient pressure, for example of 20 MPa, is reached. The gases then enter the second combustion chamber $C_2$ causing the initiation of the charge 3".

The gases then enter the transit chamber R, so that the pressure becomes sufficient to rupture the shutters blocking the apertures 50". They can then escape outward, via the plenum chamber T and the apertures 10.

Figure 7:
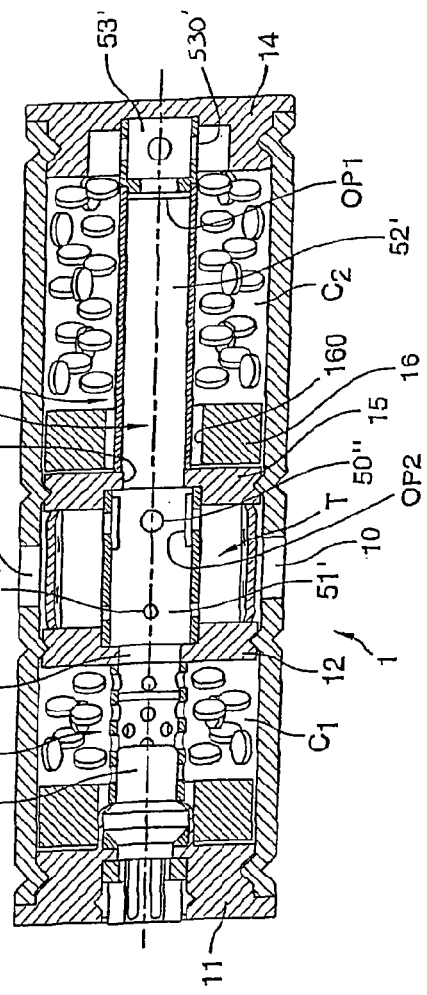

The generator in FIG. 7, like the previous one, comprises two combustion chambers $C_1$ and $C_2$ which are positioned on either side of a plenum chamber T and a transit chamber R.

The structure of the chamber $C_1$ is similar to that in the previous figure. Its grille 20 is reduced to a perforated tube.

The chamber $C_2$ has no grille. This is replaced by a solid annular part 16, with an axial opening numbered 160. It occupies the "dead volume" of the chamber, that is, the volume not occupied by the pyrotechnic charge.

A partition 12 separates the first combustion chamber from the plenum chamber T, while a partition 15 separates this chamber from the second combustion chamber. Both partitions are penetrated by a single nozzle 120, respectively 150.

Although not shown, the nozzle 120 is blocked, on the side of the first combustion chamber, by a shutter that ruptures, for example, at a pressure of about 20 MPa.

The nozzle 160 of the part 16 has a slightly larger diameter than that of the nozzle 150.

The transit chamber R consists of a cylindrical duct 5' of which a first end is fitted into the nozzle 120 of the partition 12, while the second end is fitted into the ring 14, in which a recess has been provided for this purpose.

This duct in fact consists of several distinct portions.

The first 51' of larger diameter, is the one positioned at the level of the plenum chamber T.

It has two series of peripheral apertures 50' and 50" which cause it to communicate with the plenum chamber.

The apertures 50', of small diameter, are always open, while the apertures 50", of larger diameter, are blocked by a shutter OP2, which ruptures, for example, at a pressure of 30 MPa.

The second portion 52' traverses the second combustion chamber $C_2$. It is extended by the third portion 53' which constitutes the end of the duct.

The latter has a series of peripheral apertures 530' which make it communicate with the chamber $C_2$.

The communication zone between the second and third portions, of limited diameter, is blocked, on the second portion side, by a shutter OP1 which ruptures, for example, at a pressure of about 20 MPa.

In operation, and as soon as a sufficient pressure is reached in the combustion chamber $C_1$, the shutter of the nozzle 120 ruptures.

The outgoing gases are divided into two streams. The first $F_1$ consists of the fraction entering the duct 5' and exits directly therefrom via the apertures 50', then enters the plenum chamber T and exits via the discharge apertures 10.

The second stream $F_2$ is formed from the gases stored progressively in the duct 5'. As soon as the pressure therein is sufficiently high, the shutter OP1 ruptures, and the gases enter the combustion chamber $C_2$, via the apertures 530'.

Following the combustion of the charge, the gases exit into the transit chamber R, via the apertures 530'. The pressure is then sufficiently high to rupture the shutters OP2, so that the gases can exit both via the apertures 50' and 50".

Figure 8:
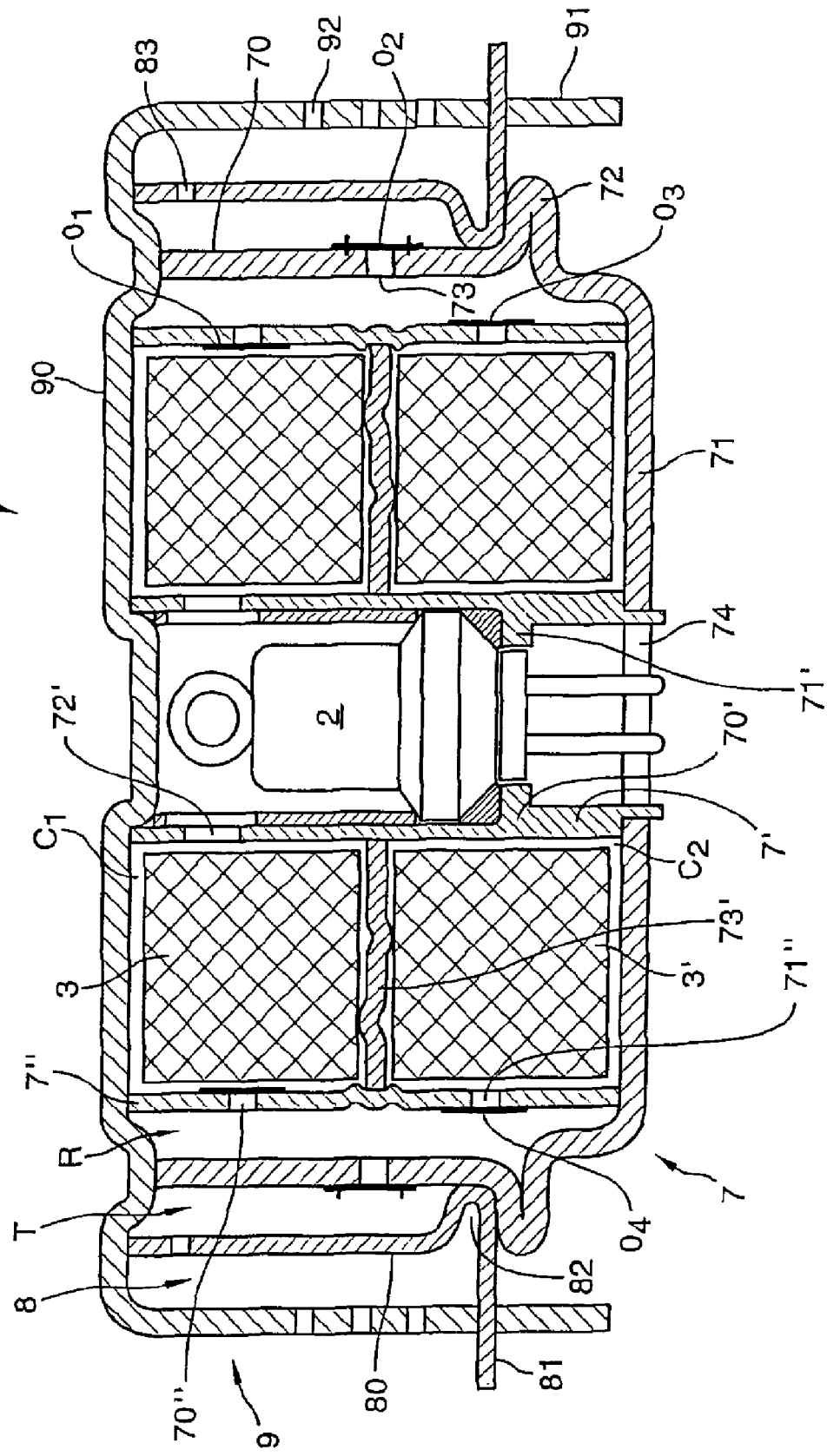
FIG. 8 is a view of another embodiment of the generator, also along a longitudinal midplane.

The generator 1 shown in FIG. 8 is referred to as a "hamburger" generator.

It consists of a case-shaped hollow cylindrical body 7, comprising a side and vertical wall 70 and a flat bottom 71, in a single piece.

Substantially at mid-height, the wall 70 is perforated with a series of apertures 73.

The lower part of this wall is outwardly pinched to form an annular peripheral rim 72, in a direction generally perpendicular to said wall.

The center of the bottom 71 is perforated by a circular aperture 74.

The case 7 receives a cylindrical tubular part 7' of which the height is substantially the same as the wall 70. Its diameter and its conformation are such that its lower end is engaged in the aperture 74 of the bottom 71 of the case 7, and is fitted therein.

The part 7' has a transverse partition 71' open at its center. This partition serves as the base of an initiator 2, its electrodes passing through the partition 71' and the aperture 74.

The cylindrical wall 70' of the part 7' is perforated, in its upper part, with a series of apertures 72', for making the initiator 2 communicate with the exterior.

The case 7 also receives a cylindrical tube 7" of larger diameter. Its wall has two series of apertures 70" and 71", respectively arranged at three-quarters and one-quarter of its height.

A transverse partition 73' extends between the outer side of the wall 70' of the part 7' and the tube 7". This serves to divide the space thus bounded into two, so that the upper space forming the combustion chamber $C_1$ receives a first annular pyrotechnic charge 3, while the lower space forming the combustion chamber $C_2$ receives a second annular pyrotechnic charge 3'.

The tube 7", together with the wall 70 of the case 7, bounds an annular transit chamber R which surrounds the combustion chambers $C_1$ and $C_2$.

A cylindrical part 8 is engaged into the exterior of the case, its wall 80 extending inwardly to form a fold 82, which extends outwardly to form an annular peripheral collar 81. In its upper part, the wall 80 has a series of apertures 83. The fold 82 bears against the rim 72.

The wall 70 of the case, together with the wall 80 of the part 8, bounds a plenum chamber T.

The assembly is covered with a lid 9 of which the bottom 90 bears on the upper ends of the parts described above. Fastening means, for example by welding, are provided. The bottom 90 is extended by a cylindrical wall 90 which surrounds the assembly, and is attached to the collar 81.

The apertures 70" of the part 7" are blocked, on the combustion chamber $C_1$ side, by cemented shutters $O_1$ which rupture at a pressure of 20 MPa, for example.

Some of the apertures 73 of the case, for example half, are blocked, on the plenum chamber T side, by welded shutters $O_2$, which rupture at a pressure of 10 MPa for example. For this purpose, large-diameter girth welds are used, for example.

The apertures 71" of the part 7" are blocked, on the combustion chamber $C_2$ side, by cemented shutters $O_3$ which rupture at a pressure of 20 MPa for example.

Finally, the second part of the apertures 73 of the case are blocked, on the plenum chamber T side, by welded shutters $O_4$, which rupture at a pressure of 30 MPa, for example. For this purpose, small diameter girth welds are used, for example.

In operation, the action of the initiator generates hot gases which enter the combustion chamber $C_1$ causing the combustion of the charge 3. As soon as the pressure therein is sufficient, the shutters $O_1$ rupture and all the gas enters the transit chamber R.

The shutters $O_2$ then $O_3$ are then opened, as soon as the respective pressures are reached.

At this stage, the gas is divided into two streams. The first stream is the one consisting of the fraction of gas escaping via the apertures 73. It enters the plenum chamber T, exits via the apertures 83 and enters the airbag, via the apertures 92.

The second stream consists of the fraction of gas entering the second combustion chamber $C_2$, via the apertures 71". It causes the combustion of the charge 3'. The gases exit via the same apertures and enter the transit chamber R, in which they raise the pressure sufficiently to cause the opening of the shutters $O_4$.

The gas exits therefrom via the apertures 83, and enters the airbag via the apertures 92.

Figure 9:
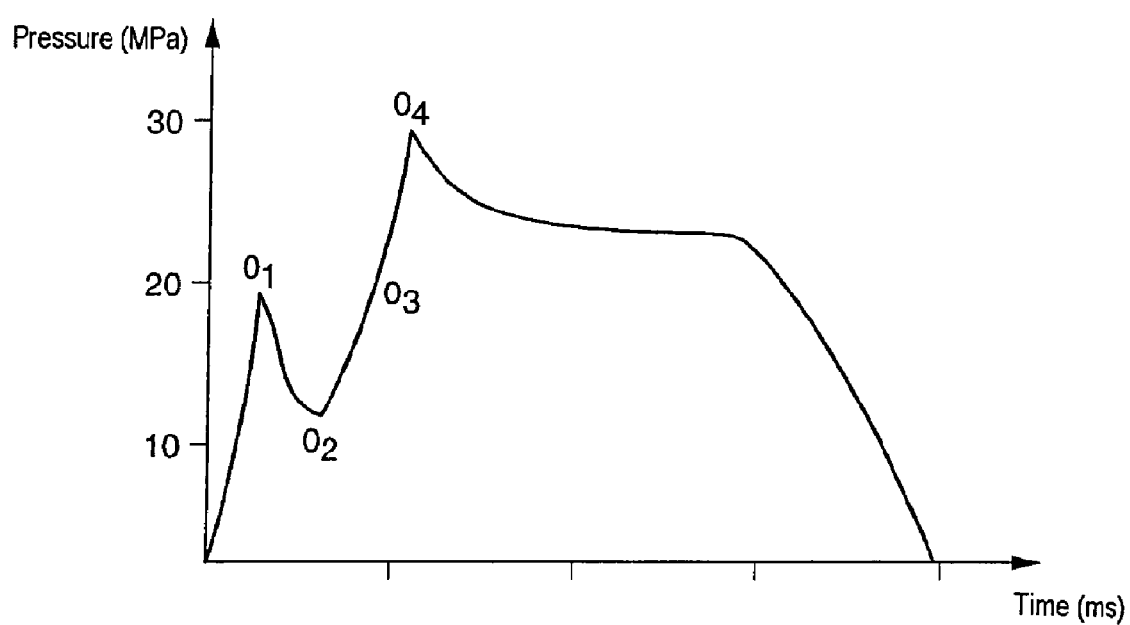
FIG. 9 is a curve showing the variation in pressure as a function of time, in the first combustion chamber of the generator in FIG. 8.

FIG. 9 shows a curve giving the values of the pressure in the first combustion chamber $C_1$, as a function of time.

The times corresponding to the opening of the respective shutters are denoted by the numerals $O_1$ to $O_4$.

The invention claimed is:

1. A pyrotechnic gas generator comprising:
   a generally tubular housing defining at least one combustion chamber, at least one plenum chamber, and a transit chamber;
   the at least one combustion chamber containing a pyrotechnic charge the combustion of which is initiated by an initiator associated with the combustion chamber; and
   the at least one plenum chamber in communication with the at least one combustion chamber for receiving a first portion of the gases generated by the combustion of the charge and for removing the first portion of the gases from the housing via at least one discharge aperture formed in said housing, the at least one plenum chamber sealed from the at least one combustion chamber by a first rupturable shutter;
   wherein the transit chamber is in communication with the at least one combustion chamber for receiving a second portion of the gases, the transit chamber operative for temporarily storing the second portion of the gases prior to delivery of the second portion to the at least one plenum; the at least one combustion chamber sealed from the transit chamber by a second rupturable shutter;
   wherein the second rupturable shutter is configured to rupture at a value of gas pressure greater than for the first rupturable shutter.

2. The generator of claim 1, further comprising a valve mechanism between the transit chamber and the at least one plenum, wherein the valve mechanism opens in response to a predetermined pressure.

3. The generator of claim 2, wherein the exit of the gases from the transit chamber is based on the gas pressure prevailing in the transit chamber.

4. The generator of claim 2, wherein the at least one plenum chamber includes a central plenum chamber and the central plenum chamber, the combustion chamber and the transit chamber are longitudinally offset;
   first and second partitions, the first partition separating the combustion chamber and the central plenum chamber, the second partition separating the central plenum chamber and the transit chamber, each partition having two communicating nozzles;
   a duct directly connecting the combustion chamber and transit chamber to one another, the duct terminating in two nozzles facing the first and second partitions, respectively;
   the nozzle of the second partition, which lacks a duct, has selective means for allowing the passage of gas, only from the transit chamber toward the plenum chamber.

5. The generator of claim 4, wherein the selective means comprises a check valve.

6. The generator of claim 4, wherein the first rupturable shutter ruptures above a first value of the gas pressure in the combustion chamber and the second shutter ruptures above a second value of the gas pressure in the transit chamber, the second value being greater than the first value.

7. The generator of claim 2, which is tubular, wherein the at least one combustion chamber includes first and second combustion chambers on either side of the plenum chamber, the at least one plenum chamber being a central plenum chamber;

a first, a second and a third partition, each partition has two communicating nozzles, the first partition separating the first combustion chamber and the central plenum chamber, the second partition separating the central plenum chamber and the transit chamber, the third partition separating the transit chamber and the second combustion chamber;

wherein the first and second combustion chambers are directly connected to one another by a duct which terminates in two nozzles, respectively facing the first and third partitions, and passing through a nozzle of the second partition, the part of the duct passing through the transit chamber has apertures for communicating with this chamber, the nozzles of the third and the second partitions, which lack a duct, have selective means for allowing the flow of gas, only from the second combustion chamber toward the transit chamber, and from the transit chamber toward the central plenum chamber.

8. The generator of claim 7, wherein the selective means comprises a check valve.

9. The generator of claim 8, wherein:
a side of the third partition turned toward the second combustion chamber comprises the first shutter which ruptures above a certain value of the gas pressure in said second combustion chamber and a side of the second partition turned toward the transit chamber comprises the second shutter which ruptures above a second value of the gas pressure in the transit chamber.

10. The generator of claim 9, wherein said transit chamber is annular and surrounds said combustion chamber;
said plenum chamber is also annular and surrounds said transit chamber;
a first partition separating the combustion chamber and the transit chamber, and a second partition separating the transit chamber and the plenum chamber, each of the first and second comprising communicating nozzles, the communicating nozzles between the transit chamber and the plenum chamber are blocked by the first and second shutters.

11. The generator of claim 1, wherein the at least one plenum chamber includes a central plenum chamber, and wherein the central plenum chamber, the combustion chamber and the transit chamber are longitudinally offset from each other.

12. A pyrotechnic gas generator comprising:
a generally tubular housing defining at least one combustion chamber, at least one plenum chamber, and a transit chamber;
the at least one combustion chamber containing a pyrotechnic charge the combustion of which is initiated by an initiator associated with the combustion chamber; and
the at least one plenum chamber in communication with the at least one combustion chamber for receiving a first portion of the gases generated by the combustion of the charge and for removing the first portion of the gases from the housing via at least one discharge aperture formed in said housing, the at least one plenum chamber sealed from the at least one combustion chamber by a first shutter;
wherein the transit chamber is in communication with the at least one combustion chamber for receiving a second portion of the gases, the transit chamber operative for temporarily storing the second portion of the gases prior to delivery of the second portion to the at least one plenum; the at least one combustion chamber sealed from the transit chamber by a second shutter;
wherein the at least one combustion chamber includes first and second combustion chambers and wherein at least some of the combustion gases from the first chamber are stored in the transit chamber, these gases subsequently igniting the pyrotechnic charge of the second chamber.

13. The generator of claim 12, which is tubular, wherein the generator comprises first and second combustion chambers on either side of a plenum chamber and a transit chamber, the transit chamber has the shape of a duct contained in the plenum chamber, a first partition separating the first combustion chamber and the plenum, a second partition separating the plenum and the second combustion chamber, each partition has a single communicating nozzle;
wherein the first and second combustion chambers are directly connected to one another by the duct which defines a transit chamber and which terminates in the nozzles; and
wherein the duct has a first and second series of apertures for communicating with the plenum chamber, placed respectively close to the first and second partitions.

14. The generator of claim 13, wherein the nozzle of the second partition is dosed by the first shutter which ruptures above a predefined pressure in said duct.

15. A pyrotechnic gas generator comprising:
a generally tubular, sealed housing having at least one combustion chamber and at least one plenum chamber, the at least one combustion chamber containing a pyrotechnic charge, the combustion of which is initiated by an initiator associated with the chamber; and
the at least one plenum chamber for receiving the gases generated by the combustion of the charge for removing the gases from the housing via at least one discharge aperture formed in said housing, wherein the housing further includes means for temporarily storing at least some of the combustion gases;
wherein the generator further includes a central plenum chamber, the combustion chamber, the central plenum chamber and the transit chamber being longitudinally offset;
first and second partitions, the first partition separating the combustion chamber and the central plenum chamber, the second partition separating the central plenum chamber and the transmit chamber, each partition having two communicating nozzles;
a duct directly connecting the combustion chamber and transit chamber to one another, the duct terminating in two nozzles facing the first and second partitions, respectively;
the nozzle of the second partition, which lacks a duct, has selective means for allowing the passage of gas, only from the transit chamber toward the plenum chamber.

16. A pyrotechnic gas generator comprising:
a generally tubular, sealed housing having first and second combustion chambers on either side of a plenum chamber, and a transit chamber, at least one of the first and second combustion chambers containing a pyrotechnic charge, the combustion of which is initiated by an initiator associated with the chamber; and
the at least one plenum chamber for receiving the gases generated by the combustion of the charge for removing the gases from the housing via at least one discharge aperture formed in said housing, wherein the housing further includes means for temporarily storing at least some of the combustion gases; and a first, a second and a third partition, each partition has two communicating nozzles, the first partition separating the first combustion chamber and the plenum chamber, the second partition separating the second partition separating the plenum chamber and the transit chamber, the third partition separating the transit chamber and the second combustion chamber;

wherein the combustion chambers are directly connected to one another by a duct which terminates in two nozzles, respectively facing the first and third partitions, and passing through a nozzle of the second partition, the part of the duct passing through the transit chamber has apertures for communicating with this chamber, the nozzles of the third and the second partitions, which lack a duct, have selective means for allowing the flow of gas, only from the second combustion chamber toward the transit chamber, and from the transit chamber toward the plenum chamber.

* * * * *